(12) United States Patent
Chen (10) Patent No.: US 7,996,704 B2
(45) Date of Patent: Aug. 9, 2011

(54) ASYNCHRONOUS FIRST IN FIRST OUT INTERFACE AND OPERATION METHOD THEREOF

(75) Inventor: Tse-Peng Chen, Taipei (TW)

(73) Assignee: Richwave Technology Corp., Taipei (TW)

(*) Notice: Subject to any disclaimer, the term of this patent is extended or adjusted under 35 U.S.C. 154(b) by 991 days.

(21) Appl. No.: 11/892,238

(22) Filed: Aug. 21, 2007

(65) Prior Publication Data

US 2009/0055677 A1  Feb. 26, 2009

(51) Int. Cl.
*G06F 5/06* (2006.01)
*G06F 5/00* (2006.01)

(52) U.S. Cl. .......................... 713/600; 710/52
(58) Field of Classification Search .......... 713/600; 710/52
See application file for complete search history.

(56) References Cited

U.S. PATENT DOCUMENTS

| | | | | |
|---|---|---|---|---|
| 4,896,337 A * | 1/1990 | Bushy, Jr. | | 375/371 |
| 4,941,156 A * | 7/1990 | Stern et al. | | 375/372 |
| 5,450,547 A * | 9/1995 | Nguyen et al. | | 713/600 |
| 6,049,769 A * | 4/2000 | Holmes et al. | | 704/278 |
| 6,191,992 B1 * | 2/2001 | Komoto | | 365/221 |
| 6,581,164 B1 * | 6/2003 | Felts et al. | | 713/400 |
| 6,934,198 B1 * | 8/2005 | Lowe et al. | | 365/189.05 |
| 7,039,145 B2 * | 5/2006 | Old | | 375/372 |
| 7,417,993 B1 * | 8/2008 | Ebergen et al. | | 370/395.72 |
| 7,562,244 B2 * | 7/2009 | Wielage | | 713/500 |
| 7,676,621 B2 * | 3/2010 | Mantey et al. | | 710/305 |
| 2002/0172310 A1 * | 11/2002 | Thamsirianunt et al. | | 375/371 |
| 2004/0001435 A1 * | 1/2004 | Wong | | 370/230 |

* cited by examiner

*Primary Examiner* — Ji H Bae
(74) *Attorney, Agent, or Firm* — Muncy, Geissler, Olds & Lowe, PLLC (57) ABSTRACT

The invention provides an asynchronous first in first out (FIFO) interface and operation method wherein a read-out clock and a write-in clock of the asynchronous FIFO interface is asynchronous. The asynchronous FIFO interface comprises a FIFO buffer, a clock controller and a variable integer divider. The FIFO buffer inputs at least one data with the write-in clock, and outputs the at least one data with the read-out clock. The clock controller outputs a clock control signal according to a number of data stored in the FIFO buffer. The variable integer divider divides a first signal to generate the read-out clock or the write-in clock by an integer divisor controlled by the clock control signal in order to adjust the number of data stored in the FIFO buffer.

14 Claims, 10 Drawing Sheets

ASYNCHRONOUS FIRST IN FIRST OUT INTERFACE AND OPERATION METHOD THEREOF

BACKGROUND OF THE INVENTION

1. Field of the Invention

The invention relates to asynchronous first in first out (FIFO) interface, and in particular relates to asynchronous FIFO interface in radio frequency (RF) apparatus.

2. Description of the Related Art

The popularity and requirement of wireless communication (e.g. cellular phones, wireless network) has led to market demand for communication systems with low cost, low power and small form-factor radio-frequency (RF) transceivers. Recently, analog transceivers, digital processors and clock generators have integrated on a single chip for satisfying the requirement of low cost, low power, and small form-factor RF transceivers. In the RF transceiver, the clock requirements of analog circuits and digital circuits are different. For example, the analog-to-digital converter (ADC) and digital-to-analog converter (DAC) in the analog circuits require low jitter clocks to increase the signal to noise ratio (SNR) while converting. The digital filters in the digital circuit require fixed frequency clock to prevent the filter shaping from being worse while the digital filter can tolerate high jitter clocks.

Figure 1:
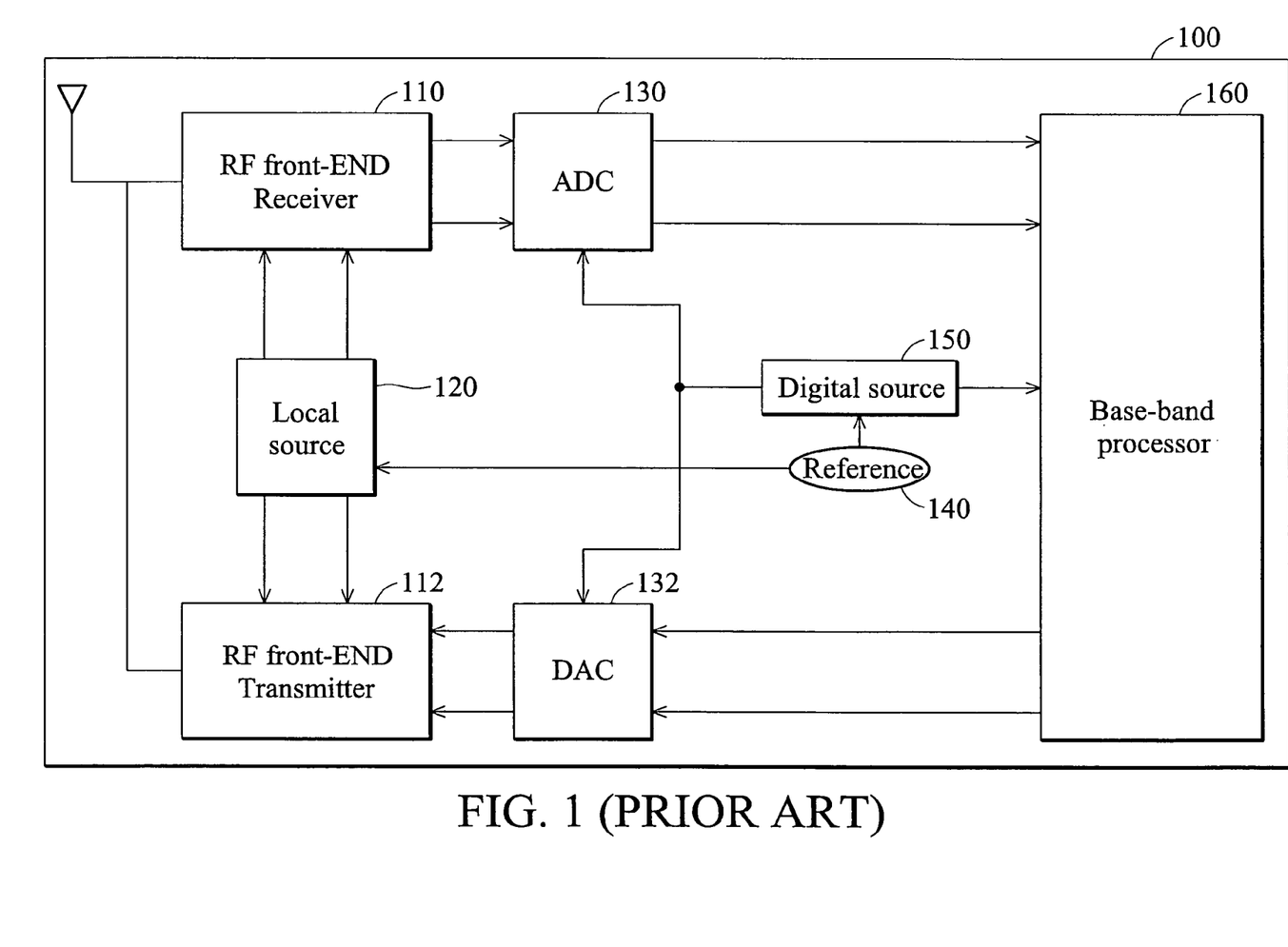
FIG. 1 is a block diagram of conventional RF transceiver 100 on a single chip.
Figure 2:
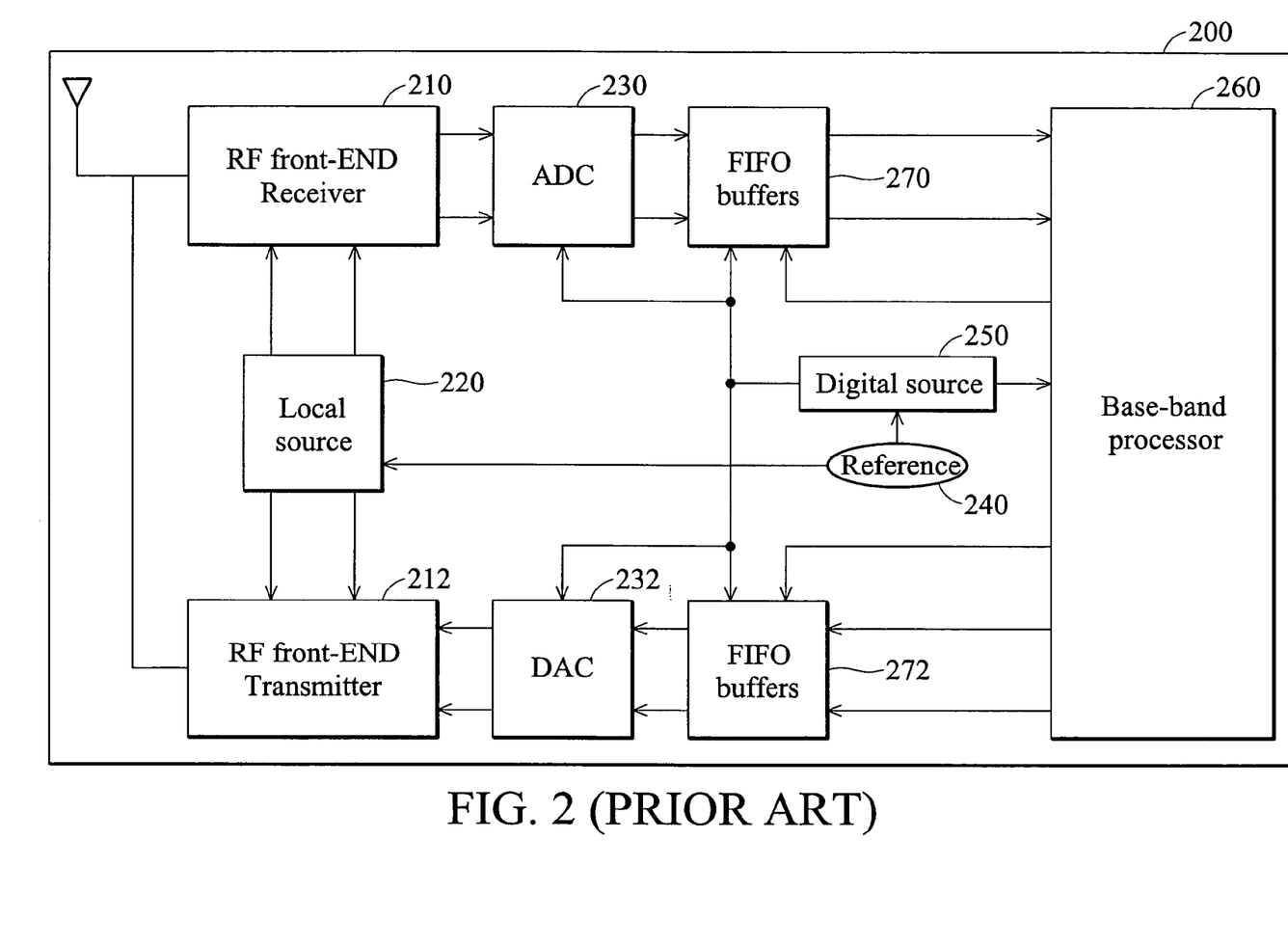
FIG. 2 is a block diagram of conventional RF transceiver 200 with FIFO buffers on a single chip.

FIG. 1 is a block diagram of conventional RF transceiver 100 on a single chip. A RF front-end receiver 110 receives a first RF signal and down-converts the first RF signal to at least one first intermediate frequency (IF) signal according to at least one local signal generated by a local source 120. A RF front-end transmitter 112 transmits a second RF signal and up-converts at least one second IF signal to the second RF signal according to the at least one local signal. A clock source 150 generates a digital clock to a base-band processor 160, an ADC 130 and a DAC 132 for processing digital signals synchronously, However, the clock phases of each circuit, for example the ADC 130, the DAC 132 and the base-band processor 160, will be different due to practical circuit layout. That will lead to the digital signals transmission error. To prevent that problem, an interface, first in first out (FIFO) buffers, is added between the ADC 130, the DAC 132 and the base-band processor 160. FIG. 2 is a block diagram of conventional RF transceiver 200 with FIFO buffers on a single chip. Similarly, a RF front-end receiver 210 receives a first RF signal and down-converts the first RF signal to at least one first IF signal according to at least one local signal generated by a local source 220. A RF front-end transmitter 212 transmits a second RF signal and up-converts at least one second IF signal to the second RF signal according to the at least one local signal. A clock source 250 generates a digital clock to a base-band processor 260, an ADC 230, a DAC 232 and FIFO buffers 270 and 272. The clock source 250 provides synchronous digital clock to the base-band processor 260, the ADC 230, the DAC 232 and the FIFO buffers 270 and 272. Although the clock phases of each circuit may still be different, the blocks 270 and 272 can be buffers between the analog circuit and the digital circuit to prevent transmission from error.

However, the ADC 230, the DAC 232, the base-band processor 260 and the FIFO buffers 270 and 272 still operate synchronously. For synchronization, the ADC 230, the DAC 232 and the base-band processor 260 have to receive synchronous clock generated from the same clock source 250. Therefore, for satisfying the low jitter clock requirement of the ADC 230 and the DAC 232, the clock source 250 which also provides the digital clock to the digital circuits must be low jitter although the digital circuits do not require low jitter clock. The low jitter clock source, the clock source 250, will increase chip cost. However, a low jitter source, the local source 220 is existed in the conventional RF transceiver 200 for increasing SNR and reducing adjacent channel blocking effect while down-converting. If the clock of the ADC 230 and DAC 232 can be provided by the local source 220, the clock source 250 can be a high jitter source to reduce hardware cost, otherwise it can be a fixed frequency source. In this way, the RF transceiver may give rise to another problem. The clock of the ADC 230 and DAC 232 provided by the local source 220 may asynchronous to the clock of the base-band processor 260 provided by the clock source 250. The interface coupled between the ADC 230, DAC 232 and the base-band processor 260 should operate under asynchronous data communication.

Asynchronous FIFO interfaces and operation method thereof are thus desired.

BRIEF SUMMARY OF INVENTION

The invention provides an asynchronous first in first out (FIFO) interface and operation method wherein a read-out clock and a write-in clock of the asynchronous FIFO interface is asynchronous.

According to an aspect of the invention, the asynchronous FIFO interface comprises a FIFO buffer, a clock controller and a variable integer divider. The asynchronous FIFO interface comprises a FIFO buffer, a clock controller and a variable integer divider. The FIFO buffer inputs at least one data with the write-in clock, and outputs the at least one data with the read-out clock. The clock controller outputs a clock control signal according to a number of data stored in the FIFO buffer. The variable integer divider divides a first signal to generate the read-out clock or the write-in clock by an integer divisor controlled by the clock control signal in order to adjust the number of data stored in the FIFO buffer. When the number of data stored in the FIFO buffer comes to a first threshold or a second threshold lower than the first threshold, the integer divisor is changed in order to adjust the number of data stored in the FIFO buffer wherein the first threshold is full and the second threshold is empty.

According to another aspect of the invention, an operation method of an asynchronous first in first out (FIFO) interface wherein a read-out clock and a write-in clock of the asynchronous FIFO interface is asynchronous, comprising: writing a plurality of digital signal with the write-in clock into a FIFO buffer, detecting an number of data stored in the FIFO buffer, dividing a first signal to generate one of the read-out clock or the write-in clock by an integer divisor to adjust the number of data stored in the FIFO buffer wherein the integer divisor is controlled according to the number of data stored in the FIFO buffer and outputting the at least one digital signal with the read-out clock from the FIFO buffer. When the number of data stored in the FIFO buffer comes to a first threshold or a second threshold lower than the first threshold, the integer divisor is changed in order to adjust the number of data stored in the FIFO buffer wherein the first threshold is full and the second threshold is empty.

According to another aspect of the invention, a circuit with an asynchronous first in first out (FIFO) interface comprises a first circuit portion, a second circuit portion and an asynchronous interface. The first circuit portion has a first signal generated by a first source. The second circuit portion operates according to a second signal and communicating at least one data with the first circuit portion. The asynchronous FIFO interface comprises a FIFO buffer device, a clock control device, a variable integer divider device. The FIFO buffer device coupled between the first and second circuit portions buffers the at least one data communicated between the first and second circuit portions wherein the FIFO buffer device inputs the at least one data according to a write-in clock and outputs the at least one data according to a read-out clock. The clock controller device outputs at least one clock control signal according to a number of data stored in the FIFO buffer device. The variable integer divider device divides the first signal to generate the write-in clock for the FIFO buffer device when the at least one data transmitted from the first circuit portion to the second circuit portion, and generates the read-out clock for the FIFO buffer device when the at least one data transmitted from the second circuit portion to the first circuit portion wherein the write-in clock or the read-out clock generated by dividing the first signal is asynchronous with the second signal.

According to another aspect of the invention, an operation method of a transceiver with an asynchronous interface comprises: receiving at least one first radio frequency (RF) signal, down-converting the at least one first RF signal to be at least one first analog signal, detecting a number of data stored in the first FIFO buffer, dividing a first signal to generate the first clock by a first integer divisor to adjust a number of data stored in the first FIFO buffer wherein the first integer divisor is controlled according to the number of data stored in the first FIFO buffer, converting the at least one first analog signal to at least one first data with a first clock, inputting the at least one first data to a first in first out (FIFO) buffer with the first clock, outputting the at least one first data with a second signal from the first FIFO buffer wherein the first clock and the second signal is asynchronous, inputting at least one second data to a second FIFO buffer with the second signal, detecting a number of data stored in the second FIFO buffer, dividing the first signal to generate the second clock by a second integer divisor to adjust the number of data stored in the second FIFO buffer wherein the second integer divisor is controlled according to the number of data stored in the second FIFO buffer, outputting the at least one second data from the second FIFO buffer with the second clock wherein the second clock and the digital clock is asynchronous, converting the at least one second data to at least one second analog signal with the second clock, up-converting the at least one second analog signal to at least one second RF signal and transmitting the at least one second RF signal.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the subsequent detailed description and the accompanying drawings, which are given by way of illustration only, and thus are not limitative of the present invention, and wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
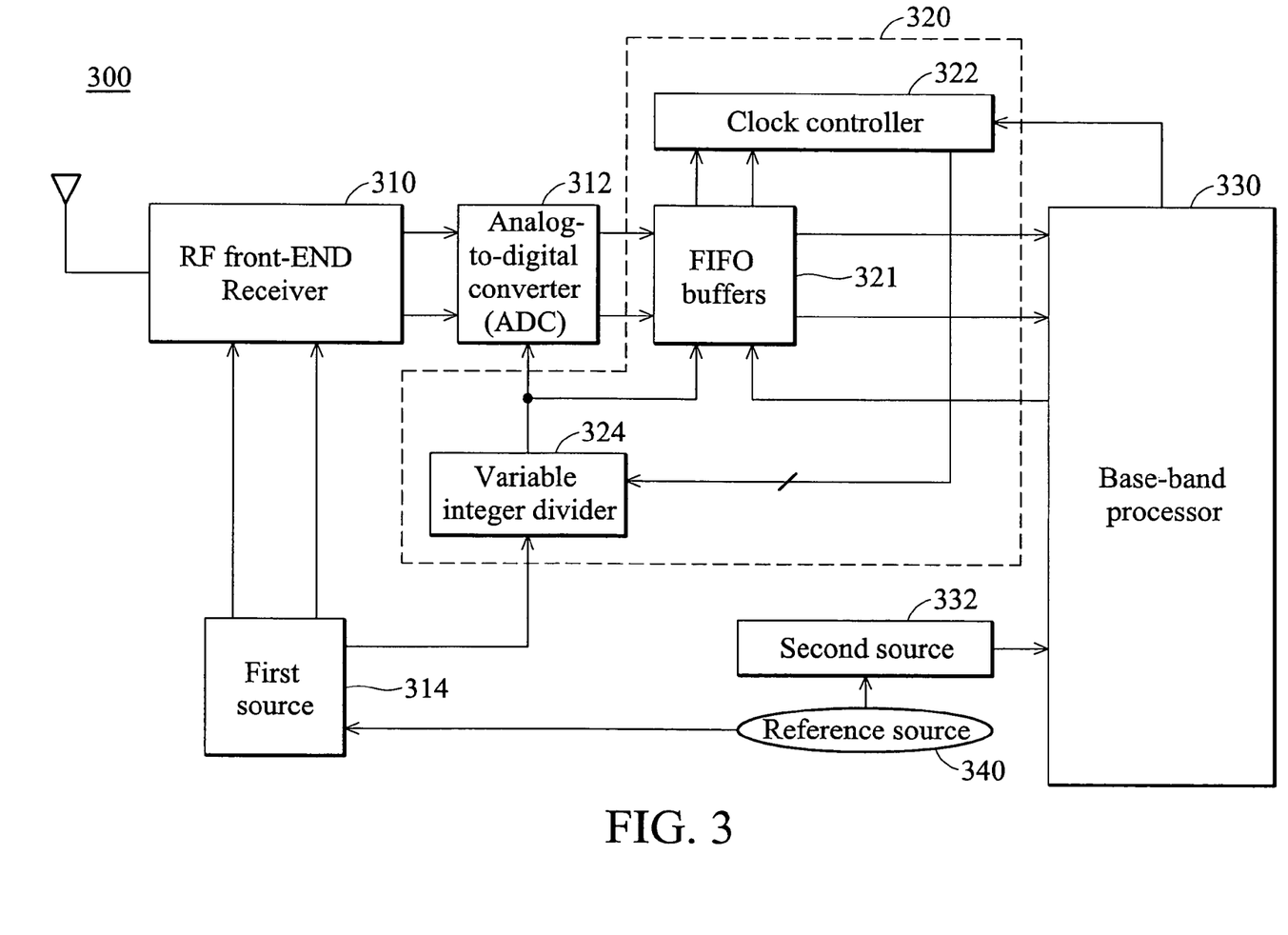
FIG. 3 is a block diagram of a receiver 300 with an asynchronous first in first out (FIFO) interface according to an embodiment of the invention.

FIG. 3 is a block diagram of a receiver 300 with an asynchronous first in first out (FIFO) interface according to an embodiment of the invention. The receiver 300 comprises a RF front-end receiver 310, a analog-to-digital converter (ADC) 312, a first source 314, a FIFO buffer 321, a clock controller 322, a variable integer divider 324, a base-band processor 330, a second source 332 and a reference source 340.

The RF front end receiver 310 receives a radio frequency (RF) signal transmitted from a transmitter (not shown) and down-converts the RF signal to at least one intermediate frequency (IF) signal according to at least one local signal generated by the first source 314. The at least one local signal is generated by the low jitter first source 314 for increasing the signal to noise ratio (SNR) and reducing adjacent channel blocking effect while down-converting. The ADC 312 converts the at least one IF signal to at least one data and outputs the at least one data with a first variable frequency clock generated according to the at least one local signal for preventing additional low jitter sources and satisfying the low jitter clock requirement. The process of generating the clock of ADC 312 will be illustrated in detail latter. The base-band processor 330 operates signal processing functions, for example transmission mode detecting, time-domain data processing, frequency-domain data processing and channel decoding etc., on the at least one data according to a second signal generated by the second source 332. The second source 332 is a fixed frequency source, otherwise it can be a high jitter source, for example a ring oscillator, for reducing hardware cost. The second signal functions as a clock of the base-band processor 330. The first source 314 and the second source 332 can share a single reference source 340 for further reducing hardware cost.

The clock of the base-band processor 330 provided by the second source 332 may be asynchronous to the clock of the ADC 312 provided by different sources. Therefore an asynchronous FIFO interface 320 is needed for dealing with the asynchronous data communication between the base-band processor 330 and the ADC 312. The asynchronous FIFO interface 320 comprises the FIFO buffer 321, the clock controller 322 and the variable integer divider 324. The FIFO buffer 321 coupled between the base-band processor 330 and the ADC 312 buffers the at least one data communicated between them. The FIFO buffer 321 inputs the at least one data according to a write-in clock and outputs the at least one data to the base-band processor 330 according a read-out clock. The write-in clock is the clock of ADC 312 and the read-out clock is the clock of base-band processor 330. The read-out clock can be provided by the second source directly or provided by the base-band processor 330. However, when the write-in clock of the FIFO buffer 321 and the read-out clock of the FIFO buffer 321 are asynchronous, the data number in the FIFO buffer 321 will increase or decrease gradually.

Figure 4A:
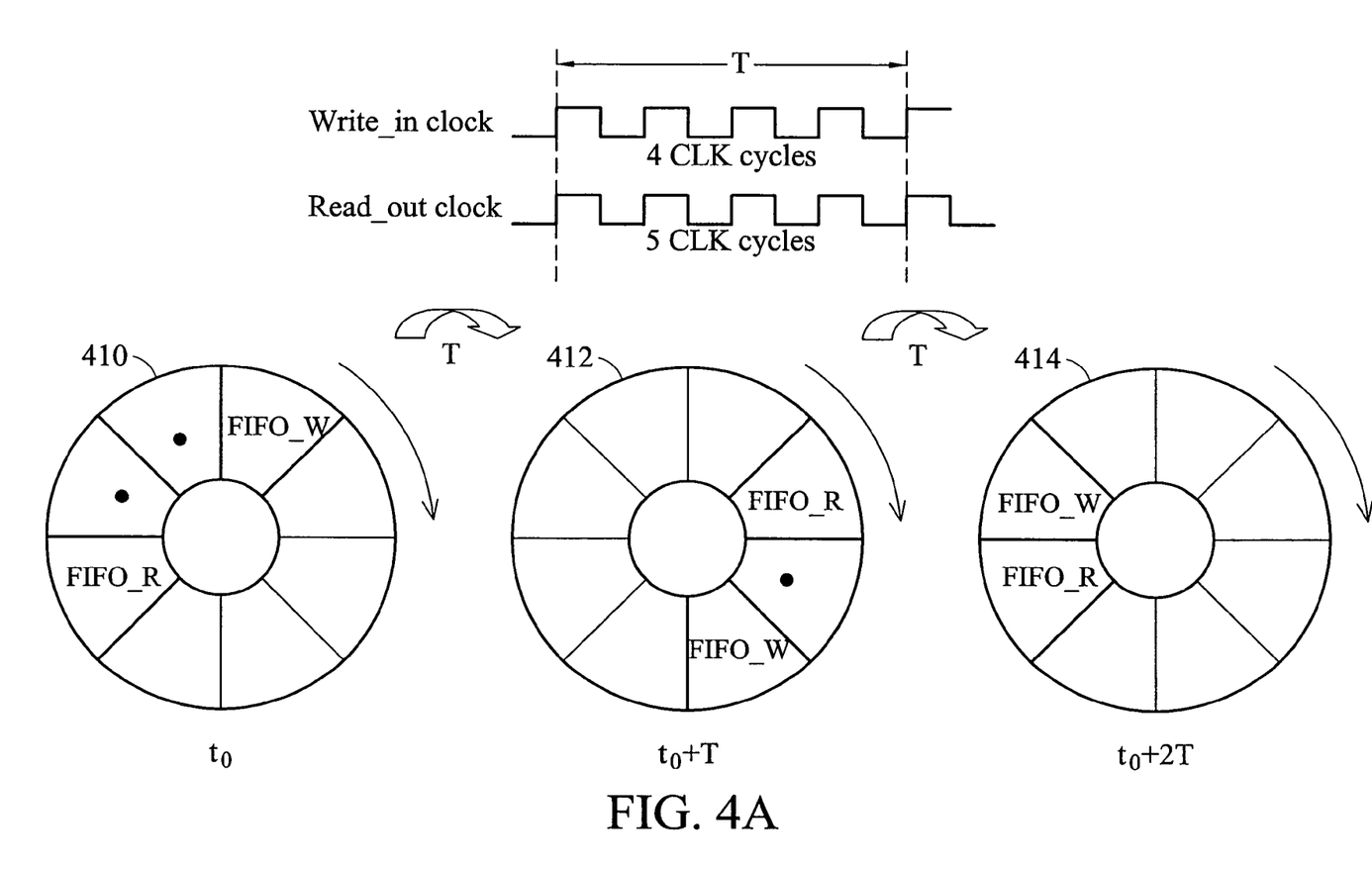
FIG. 4A shows that the data number in the FIFO buffer 321 is decreasing.

FIG. 4A shows that the data number in the FIFO buffer 321 is decreasing. For example, the frequency of write-in clock is 4/T and the frequency of read-out clock is 5/T. The read-out speed of the FIFO buffer 321 is faster than the write-in clock of the FIFO buffer 321, therefore the data number will decrease one every T duration. Referring to FIG. 4A, FIFO_R indicates that the FIFO buffer 321 read-out data at that field, FIFO_W indicates that the FIFO buffer 321 write-in data at that field and the dot indicates the data stored in the buffer. 410 represents the FIFO buffer 321 at $t_o$, 412 represents the FIFO buffer 321 at $t_o$+T and 414 represents the FIFO buffer 321 at $t_o$+2 T. When the data number falls below the lower limit, the empty signal of the first FIFO buffer will be pulled up and transmitting errors happened at the next duration.

Figure 4B:
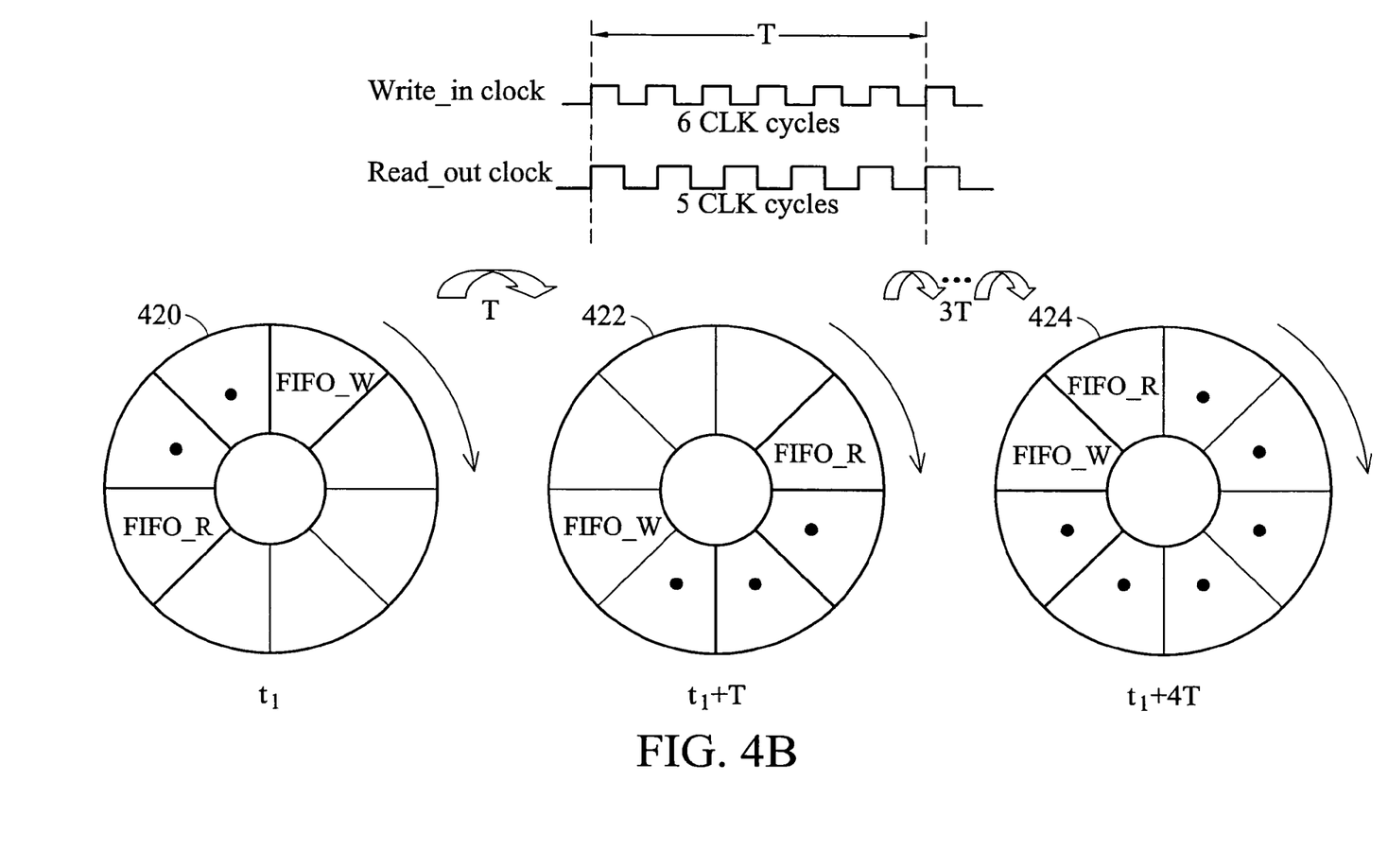
FIG. 4B shows that the data number in the FIFO buffer 321 is increasing.

FIG. 4B shows that the data number in the FIFO buffer 321 is increasing. For example, the frequency of write-in clock is 6/T and the frequency of the read-out clock is 5/T. The data number will increase one every T duration. Referring to FIG. 4A, 420 indicates the data number of the FIFO buffer 321 at $t_1$, 422 indicates the data number of the FIFO buffer 321 at $t_1$+T and 424 indicates the data number of the FIFO buffer 321 at $t_1$+4 T. When the data number exceeds the upper limit, the full signal of the first FIFO buffer will be pulled up and transmitting errors happened at the next duration.

Figure 5:
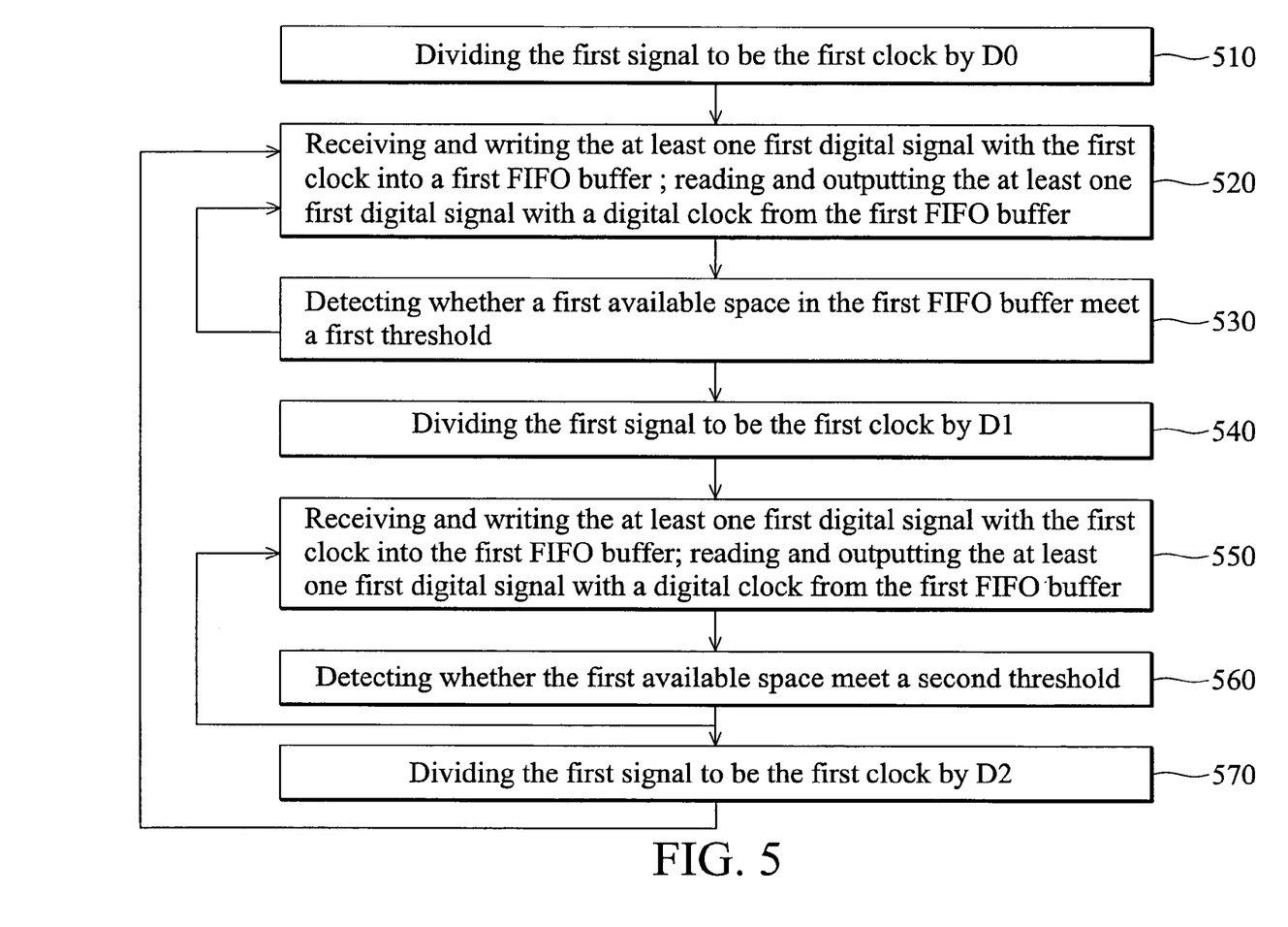
FIG. 5 is a flow chart of an operation method of an asynchronous FIFO interface in the receiver 300.

As illustrated above, when the read-out clock and the write-in clock are asynchronous, the FIFO buffer 321 will run in to the full or empty problem which leads to data communication error. However, that can be prevented by controlling the frequency of the write-in clock. FIG. 5 is a flow chart of an operation method of an asynchronous FIFO interface 320 in the receiver 300. In step 510, with reference also to FIG. 3 hereinafter, the variable integer divider 324 divides the first signal generated from the first source 314 to generate the write-in clock by a first integer divisor D0 controlled by the clock controller 322. In step 520 the FIFO buffer 321 inputs the at least one data with the write-in clock to the FIFO buffer 321 and outputs the at least one data with read-out clock from the FIFO buffer 321 to the base-band processor 330.

In step 530, the clock controller 322 detects whether the number of data stored in the FIFO buffer 321 meet a first threshold. The first threshold is a predetermined value for determining the number of data stored in the FIFO buffer 321 exceeding an upper limit which represents the upper safety range of the number of the data stored in the FIFO buffer 321 or not, for example full. If the number of data stored in the FIFO buffer 321 does not meet the first threshold, proceeding to step 520 again.

If the number of data stored meets the first threshold, proceeding to step 540. In the step 540, the variable integer divider 324 divides the first signal generated from the first source 314 to generate the write-in clock by a first integer divisor D1 controlled by the clock controller 322 to adjust the number of data stored in the FIFO buffer 321. The frequency of write-in clock is slightly lower than the read-out clock for decreasing the data number in the FIFO buffer 321.

In step 550, the FIFO buffer 321 inputs the at least one data with the write-in clock to the FIFO buffer 321 and outputs the at least one data with read-out clock from the FIFO buffer 321 to the base-band processor 330. It should be noted that the frequency of the write-in clock is slightly lower than the frequency of read-out clock therefore the data number will decrease gradually.

In step 560, the clock controller 322 detects whether the number of data stored in the FIFO buffer 321 meet a second threshold. The second threshold is a predetermined value for determining the number of data stored in the FIFO buffer 321 exceeding a lower limit which represents the lower safety range of the number of the data stored in the FIFO buffer 321 or not, for example empty. If the number of data stored in the FIFO buffer 321 dose not meet the second threshold, proceeding to the step 550 again.

If the number of data stored in the FIFO buffer 321 meets the second threshold, proceeding to step 570. In the step 570, the variable integer divider 324 divides the first signal generated from the first source 314 to generate the write-in clock by a second integer divisor D2 controlled by the clock controller 322 to adjust the number of data stored in the FIFO buffer 321. The frequency of write-in clock is slightly higher than the read-out clock for increasing the data number in the FIFO buffer 321.

Although the number of data stored in the FIFO buffer 321 is sequentially detected whether meeting an upper limit (in step 530) then whether meeting a lower limit (in step 560), people skilled in the art shall know that the number of data stored in the FIFO buffer 321 can be detected whether meeting a lower limit first or can be detected whether meeting upper and lower limit at the same time. The foregoing description is only for illustration.

In order to prevent operation complexity, the first and second threshold may be full and empty, respectively, to reduce the frequency of changing integer divisor. The integer divisor may be changed between two consecutive integers for further simplifying the controlling procedure. According to the embodiment of the invention, the problem of asynchronous communication between the ADC 312 and the base-band processor 330 can be solved. Preventing additional low jitter sources and satisfying the low jitter clock requirement of analog circuits can be achieved by adding the asynchronous interface to the receiver 300 therefore low cost and high performance can be obtained at the same time.

Figure 6:
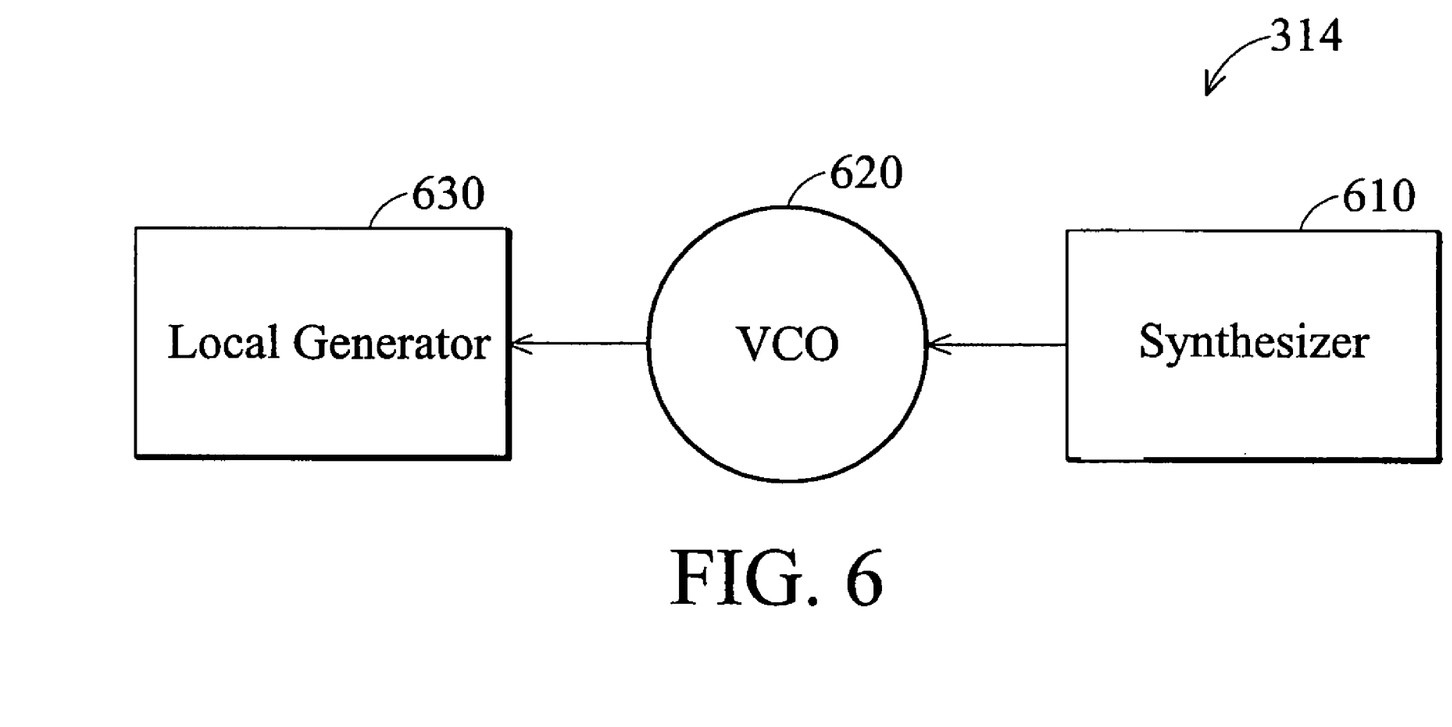
FIG. 6 is a detail block diagram of the first source 314.

FIG. 6 is a detail block diagram of the first source 314. The first source 314 further comprises a synthesizer 610, a voltage control oscillator (VCO) 620 and a local generator 630. The VCO 620 outputs a VCO signal to the local generator 630 according to a control voltage. The synthesizer 610 outputs the control voltage according to the reference source 340 and VCO 620 for stabilizing the VCO signal at a desired frequency. The local generator 630 outputs the at least one first local signal according to the VCO signal. The first signal can be provided from the VCO 620 or from the local generator 630.

Figure 7:
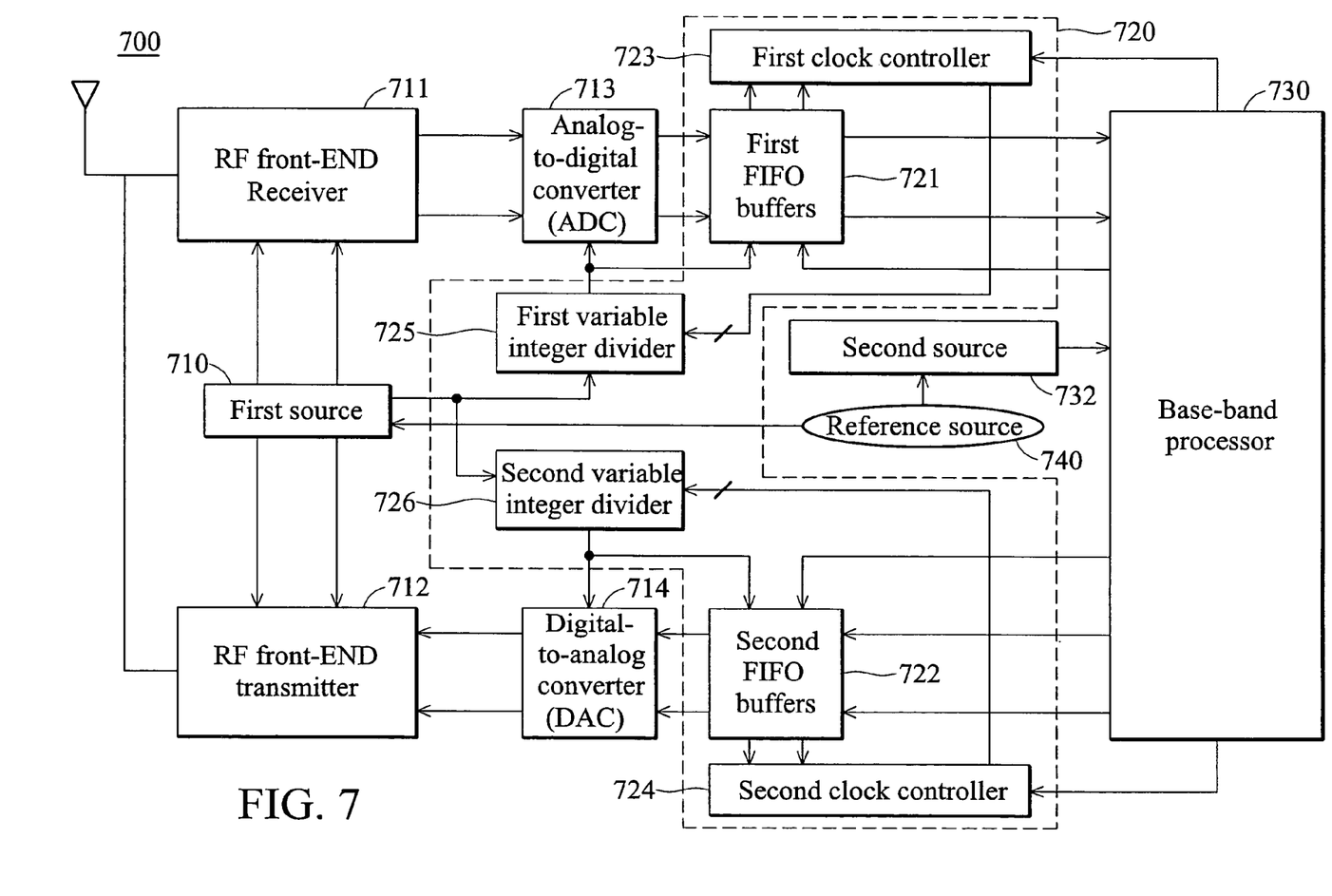
FIG. 7 is a block diagram of a radio frequency (RF) transceiver 700 with an asynchronous FIFO interface on a single chip according to an embodiment of the invention.

FIG. 7 is a block diagram of a radio frequency (RF) transceiver 700 with an asynchronous FIFO interface on a single chip according to an embodiment of the invention. The RF transceiver 700 comprises a first circuit portion, a second circuit portion and the asynchronous FIFO interface 720. The first circuit portion comprises a RF front-end receiver 711, a RF front-end transmitter 712, a first source 710, an analog-to-digital converter (ADC) 713, a digital-to-analog converter (DAC) 714. The asynchronous FIFO interface 720 comprises a first FIFO buffer 721, a first clock controller 723, a first variable integer divider 725, a second FIFO buffer 722, a second clock controller 724 and a second variable integer divider 726. The second circuit portion comprises a baseband processor 730, a second source 732. The RF transceiver 700 further comprises a reference source 740.

The first circuit portion has a first signal generated by the first source 710. The second circuit portion operates according to a second signal generated by the second source—732. The second signal functions as a clock for the second circuit portion. The asynchronous FIFO interface 720 coupled between the first circuit portion and the second circuit portion buffers at least one data communicated between the first circuit portion and the second circuit portion.

Figure 8A:
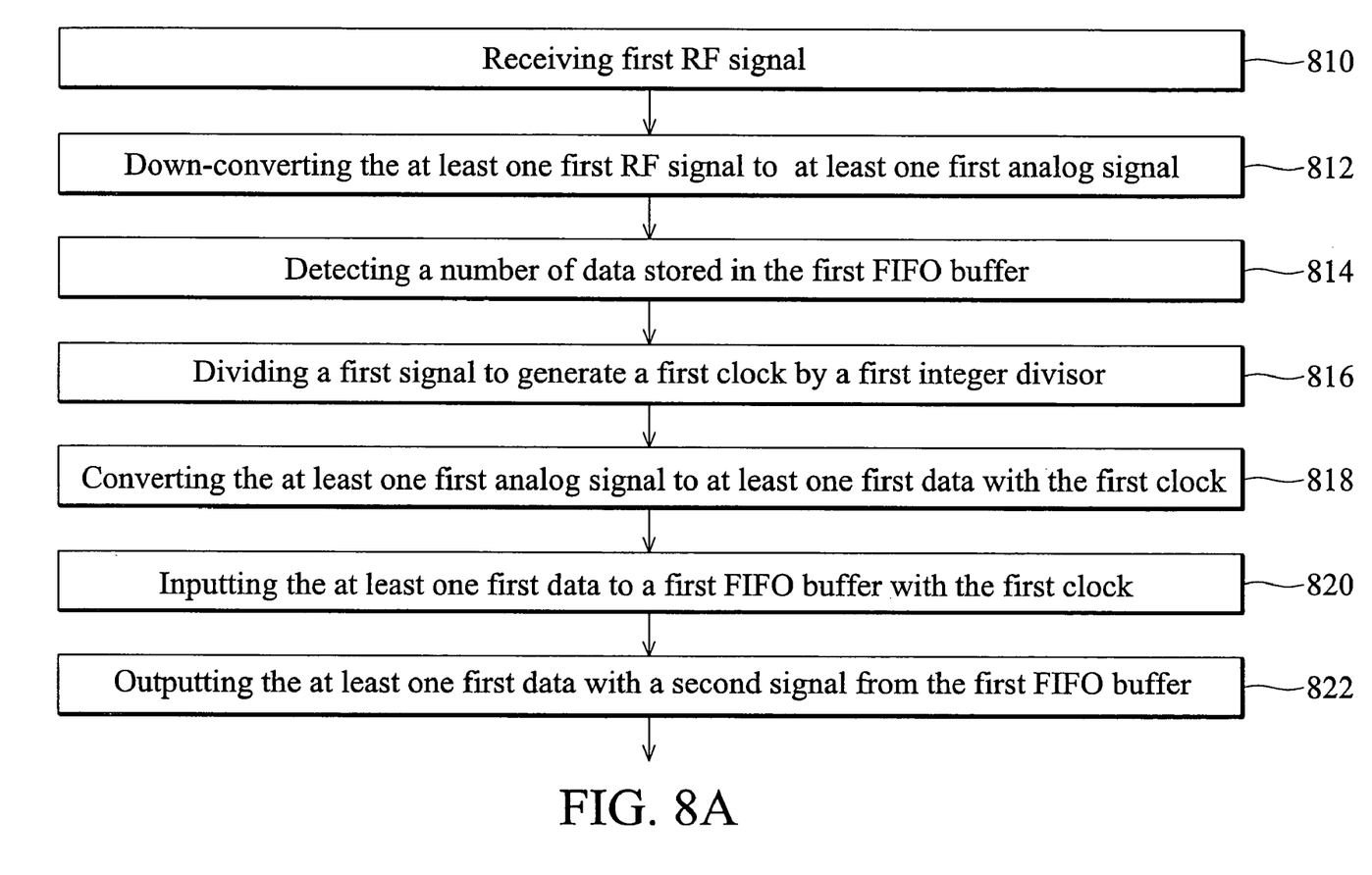
FIGS. 8A and 8B show a flow chart of an operation method of the RF transceiver with the asynchronous FIFO interface 720 according to an embodiment of the invention.

FIG. 8A is a flow chart of an operation method of the receiver part of the RF transceiver with the asynchronous FIFO interface 720 according to an embodiment of the invention. In step 810, reference to FIG. 7 also hereinafter, the RF front end receiver 711 receives a first radio frequency (RF) signal transmitted from a transmitter (not shown) and, in step 812, down-converts the first RF signal to at least one first intermediate frequency (IF) signal according to at least one local signal generated by the first source 710. The at least one local signal is generated by the low jitter first source 710 for increasing the signal to noise ratio (SNR) and reducing adjacent channel blocking effect while down-converting.

The clock of the base-band processor 730 provided by the second source 732 may be asynchronous to the clock of the ADC 713 provided by different sources. Therefore the asynchronous FIFO interface 720 is needed for dealing with the asynchronous data communication between the base-band processor 730 and the ADC 713. However, when the first write-in clock of the first FIFO buffer 721 and the first read-out clock of the first FIFO buffer 721 are asynchronous, the data number in the first FIFO buffer 721 will increase or decrease gradually.

As illustrated above, when the first read-out clock and the first write-in clock are asynchronous, the first FIFO buffer 721 will run in to the full or empty problem which leads to data communication error. However, that can be prevented by controlling the frequency of the first write-in clock. In step 814, the first clock controller 723 detects a number of data stored in the first FIFO buffer 721 and outputs the first write-in clock control signal according to the number of data stored in the first FIFO buffer 721. In step 816, the first variable integer divider 723 divides the first signal to generate the first clock by a first integer divisor controlled by the first write-in clock control signal. When the number of data stored in the first FIFO buffer comes to a first threshold or a second threshold lower than the first threshold, the first integer divisor is changed to control the frequency of the first write-in clock for adjusting the number of data stored in the first FIFO buffer 721. The detail operation method is similar to the operation method of an asynchronous FIFO interface illustrated in FIG. 5. The first threshold can be full and second threshold can be empty for reducing the frequency of changing the first integer divisor In step 818, the ADC 713 converts the at least one first IF signal to at least one first data and outputs the at least one first data with the first write-in clock for preventing additional low jitter sources and satisfying the low jitter clock requirement.

While the at least one first data is transmitted from the first circuit portion to the second circuit portion at the receiver part, in step 820, the first FIFO buffer 721 inputs the at least one first data according to the first write-in clock.

In step 822, the first FIFO buffer 721 outputs the at least one first data to the base-band processor 730 with the first read-out clock. The first read-out clock can be provided by a second signal directly or by the base-band processor 730. The base-band processor 730 operates signal processing functions, for example transmission mode detecting, time-domain data processing, frequency-domain data processing and channel decoding etc., on the at least one first data according to a second signal generated by the second source 732. The second source 732 is a fixed frequency source, otherwise it can be a high jitter source, for example a synthesizer utilizing ring oscillators, for reducing hardware cost. The second signal functions as a clock of the base-band processor 730. The first source 710 and the second source 732 can share a single reference source 740 for further reducing hardware cost. The single reference source 740 can be a general low frequency source, for example 32.768 kHz crystal, for cost down.

Figure 8B:
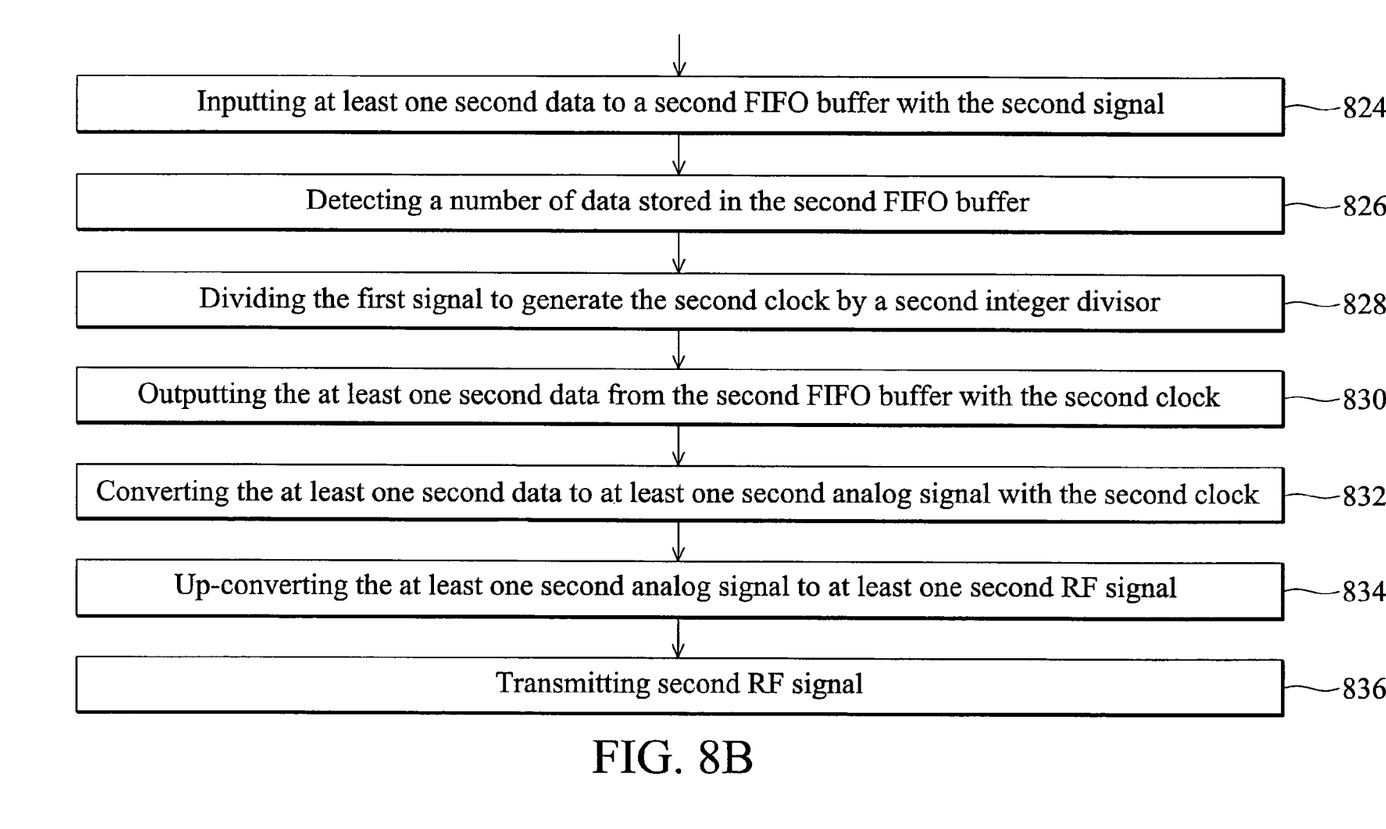

FIG. 8B shows a flow chart of an operation method of the transmitter part of the RF transceiver with the asynchronous interface according to an embodiment of the invention. The operation method of the transmitter part is similar to receiver part. While at least one second data is transmitted from the second circuit portion to the first circuit portion at the transmitter part, in step 824, the second FIFO buffer 722 inputs the at least one second data according to a second write-in clock from the base-band processor 730 and outputs the at least one second data to the DAC 714 according to a second read-out clock. The second read-out clock is the clock of the DAC 714. The second write-in clock can be provided by the second source directly or by the base-band processor 730. When the second write-in clock of the second FIFO buffer 722 and the second read-out clock of the second FIFO buffer 722 are asynchronous, the data number in the second FIFO buffer 722 will increase or decrease gradually.

As illustrated above, when the second read-out clock and the second write-in clock are asynchronous, the second FIFO buffer 722 will run in to the full or empty problem which leads to data communication error. However, that can be prevented by controlling the frequency of the second read-out clock. In step 826, the second clock controller 724 detects a number of data stored in the second FIFO buffer 722 and outputs the second read-out clock control signal according to the number of data stored in the second FIFO buffer 722. In step 828, the second variable integer divider 726 divides the first signal to generate the second clock by a second integer divisor controlled by the second read-out clock control signal. When the number of data stored in the second FIFO buffer comes to a third threshold or a fourth threshold lower than the third threshold, the second integer divisor is changed to control the frequency of the second read-out clock for adjusting the number of data stored in the second FIFO buffer 722. The detail operation method is similar to the operation method of an asynchronous FIFO interface illustrated in FIG. 5. The third threshold can be full and fourth threshold can be empty for reducing the frequency of changing the second integer divisor. In step 830, the second buffer 722 outputs the at least one second data to the DAC 714 with the clock of the DAC 714.

In step 832, the DAC 714 converts the at least one second data to at least one second IF signal and outputs the at least one second IF signal to the RF front end transmitter 712. The clock of the DAC 714 is generated according to the at least one local signal for preventing additional low jitter sources and satisfying the low jitter clock requirement. In step 834, the RF front end transmitter 712 up-converts the at least one second IF signal to second RF signal according to at least one local signal generated by the first source 710 and, in step 836, transmits second RF signal. The at least one local signal is generated by the low jitter first source 710 for increasing the signal to noise ratio (SNR) while up-converting. Preventing additional low jitter sources and satisfying the low jitter clock requirement of analog circuits can be achieved by adding the asynchronous interface to the transceiver 700 therefore low cost and high performance can be obtained at the same time.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A circuit with an asynchronous first in first out (FIFO) interface, comprising:
    a first circuit portion with a first signal generated by a first source;
    a second circuit portion, operating according to a second signal and communicating at least one data with the first circuit portion;
    an asynchronous FIFO interface, comprising:
    a first FIFO buffer, coupled between the first and second circuit portions to buffer the at least one data communicated between the first and second circuit portions; wherein the first FIFO buffer inputs the at least one data according to a write-in clock;
    a clock controller device, outputting at least one clock control signal according to a number of data stored in the first FIFO buffer; and
    a variable integer divider device, dividing the first signal to generate the write-in clock for the first FIFO buffer when the at least one data transmitted from the first circuit portion to the second circuit portion, wherein the write-in clock generated by dividing the first signal is asynchronous with the second signal,
    wherein the first circuit portion further comprising:
    a radio frequency (RF) front end receiver, receiving a RF signal, down-converting the RF signal to at least one analog signal according to at least one local signal;
    a analog-to-digital converter (ADC), converting the at least one analog signal to the at least one data with the write-in clock;
    wherein the at least one data is inputted into the first FIFO buffer according to the write-in clock and is outputted from the first FIFO buffer according to the second signal.

2. The circuit with the asynchronous FIFO interface as claimed in claim 1, wherein when the number of data stored in the first FIFO buffer comes to a first threshold or a second threshold lower than the first threshold, the first integer divisor is changed in order to adjust the number of data stored in the first FIFO.

3. The circuit with the asynchronous FIFO interface as claimed in claim 1, wherein the first circuit portion, the second circuit portion and the asynchronous FIFO interface are within a single chip.

4. The circuit with the asynchronous FIFO interface as claimed in claim 1, wherein the first source further comprising:
    a voltage control oscillator (VCO), outputting a VCO signal according to a control voltage;
    a synthesizer, coupled to the VCO, outputting the control voltage according to a single reference source and the VCO signal; and
    a local generator, coupled to the VCO, outputting at least one local signal according to the VCO signal;
    wherein the first signal can be provided by the VCO or the local generator.

5. The circuit with the asynchronous FIFO interface as claimed in claim 1, wherein the second signal is a high jitter signal.

6. The circuit with the asynchronous FIFO interface as claimed in claim 1, wherein the second signal is a fixed frequency signal.

7. The circuit with the asynchronous FIFO interface as claimed in claim 5, wherein the second signal is generated by a ring oscillator.

8. The circuit with the asynchronous FIFO interface as claimed in claim 1, wherein the first signal is a low jitter signal.

9. The circuit with the asynchronous FIFO interface as claimed in claim 1, wherein the first signal is a variable frequency signal.

10. A circuit with an asynchronous first in first out (FIFO) interface, comprising:
    a first circuit portion with a first signal generated by a first source;
    a second circuit portion, operating according to a second signal and communicating at least one data with the first circuit portion;
    an asynchronous FIFO interface, comprising:
    a FIFO buffer, coupled between the first and second circuit portions to buffer the at least one data communicated between the first and second circuit portions; wherein the FIFO buffer outputs the at least one data according to a read-out clock;
    a clock controller device, outputting at least one clock control signal according to a number of data stored in the FIFO buffer; and
    a variable integer divider device, dividing the first signal to generate the read-out clock for the FIFO buffer when the at least one data transmitted from the second circuit portion to the first circuit portion, wherein the read-out clock generated by dividing the first signal is asynchronous with the second signal, and
    wherein the first circuit portion further comprising:
    a radio frequency (RF) front end transmitter, up-converting at least one analog signal to the RF signal according to at least one local signal, transmitting the RF signal;
    a digital-to-analog converter (DAC), converting the at least one data to the at least one analog signal with the read-in clock;
    wherein the at least one data is inputted into the FIFO buffer according to the second signal and is outputted from the FIFO buffer according to the read-out clock.

11. A circuit with an asynchronous first in first out (FIFO) interface, comprising:
    a first circuit portion with a first signal generated by a first source;
    a second circuit portion, operating according to a second signal and communicating at least one data with the first circuit portion;
    an asynchronous FIFO interface, comprising:
    a FIFO buffer device, coupled between the first and second circuit portions to buffer the at least one data communicated between the first and second circuit portions; wherein the FIFO buffer device inputs the at least one data according to a write-in clock and outputs the at least one data according to a read-out clock;
    a clock controller device, outputting at least one clock control signal according to a number of data stored in the FIFO buffer device; and
    a variable integer divider device, dividing the first signal to generate the write-in clock for the FIFO buffer device when the at least one data transmitted from the first circuit portion to the second circuit portion, and to generate the read-out clock for the FIFO buffer device when the at least one data transmitted from the second circuit portion to the first circuit portion, wherein the write-in clock or the read-out clock generated by dividing the first signal is asynchronous with the second signal, wherein:

the first circuit portion further comprising:

a radio frequency (RF) front end receiver, receiving a first RF signal, down-converting the first RF signal to at least one first analog signal according to at least one local signal;

a radio frequency (RF) front end transmitter, up-converting at least one second analog signal to the second RF signal according to the at least one local signal, transmitting the second RF signal;

a analog-to-digital converter (ADC), converting the at least one first analog signal to at least one first data with a first write-in clock;

a digital-to-analog converter (DAC), converting the at least one second analog signal to at least one second data with a second read-out clock;

wherein the at least one data comprises the at least one first and the second data; and the FIFO buffer device further comprising:

a first FIFO buffer, coupled between the first and second circuit portions, inputting the at least one first data according to the first write-in clock, outputting the at least one first data according to a second clock; and a second FIFO buffer, coupled between the first and second circuit portions, inputting the at least one second data according to the second clock, outputting the at least one second data according to a second read-out clock;

the clock controller device further comprising:

a first clock controller, outputting a first write-in clock control signal according to a number of data stored in the first FIFO buffer; and a second clock controller, outputting a second read-out control signal according to a number of data stored in the second FIFO buffer;

the variable integer divider device further comprising:

a first variable integer divider, dividing the first signal to generate the first write-in clock by a first integer divisor controlled by the first write-in clock control signal in order to adjust the number of data stored in the first FIFO buffer; and a second variable integer divider, dividing the first signal to generate the second read-out clock by a second integer divisor controlled by the second read-out clock control signal in order to adjust the number of data stored in the second FIFO buffer.

12. The circuit with the asynchronous FIFO interface as claimed in claim 11, wherein when the number of data stored in the first FIFO buffer comes to a first threshold or a second threshold lower than the first threshold, the first integer divisor is changed in order to adjust the number of data stored in the first FIFO;

when the number of data stored in the second FIFO buffer comes to a third threshold or a fourth threshold lower than the third threshold, the second integer divisor is changed in order to adjust the number of data stored in the second FIFO.

13. An operation method of a transceiver with an asynchronous interface, comprising:

receiving at least one first radio frequency (RF) signal, down-converting the at least one first RF signal to at least one first analog signal;

detecting a number of data stored in a first first in first out (FIFO) buffer;

dividing a first signal to generate a first clock by a first integer divisor to adjust the number of data stored in the first FIFO buffer wherein the first integer divisor is controlled according to the number of data stored in the first FIFO buffer;

converting the at least one first analog signal to at least one first data with the first clock;

inputting the at least one first data to the first FIFO buffer with the first clock;

outputting the at least one first data with a second signal from the first FIFO buffer, wherein the first clock and the second signal are asynchronous;

inputting at least one second data to a second FIFO buffer with the second signal;

detecting a number of data stored in the second FIFO buffer;

dividing the first signal to generate the second clock by a second integer divisor to adjust the number of data stored in the second FIFO buffer wherein the second integer divisor is controlled according to the number of data stored in the second FIFO buffer;

outputting the at least one second data from the second FIFO buffer with the second clock, wherein the second clock and the digital clock is asynchronous;

converting the at least one second data to at least one second analog signal with the second clock;

up-converting the at least one second analog signal to at least one second RF signal; and transmitting the at least one second RF signal.

14. An operation method of a transceiver with an asynchronous interface as claimed in claim 13, wherein:

when the number of data stored in the first FIFO buffer comes to a first threshold or a second threshold lower than the first threshold, the first integer divisor is changed in order to adjust the number of data stored in the first FIFO buffer; and when the number of data stored in the second FIFO buffer comes to a third threshold or a fourth threshold lower than the third threshold, the second integer divisor is changed in order to adjust the number of data stored in the second FIFO buffer.

* * * * *